(12) United States Patent
Beck

(10) Patent No.: US 6,611,552 B2
(45) Date of Patent: *Aug. 26, 2003

(54) UNIVERSAL SERIAL BUS TRANSCEIVER AND ASSOCIATED METHODS

(75) Inventor: Mitchell Beck, Phoenix, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 112 days.

(21) Appl. No.: 09/239,494

(22) Filed: Jan. 28, 1999

(65) Prior Publication Data

US 2002/0172271 A1 Nov. 21, 2002

(51) Int. Cl.[7] .................................................. H04B 1/38
(52) U.S. Cl. ...................................... 375/219; 375/377
(58) Field of Search ................................. 375/219, 220, 375/377; 710/9

(56) References Cited

U.S. PATENT DOCUMENTS

| | | | | |
|---|---|---|---|---|
| 5,668,834 A | * | 9/1997 | Takekuma et al. | 375/257 |
| 5,945,814 A | * | 8/1999 | Covaro | 323/224 |
| 6,122,676 A | * | 9/2000 | Brief et al. | 710/9 |
| 6,279,060 B1 | * | 8/2001 | Luke et al. | 710/64 |

* cited by examiner

Primary Examiner—Stephen Chin
Assistant Examiner—David B. Lugo
(74) Attorney, Agent, or Firm—Blakely, Sokoloff, Taylor & Zafman LLP

(57) ABSTRACT

In accordance with one embodiment of the invention, an integrated circuit includes: a transceiver capable of transmitting and receiving signals complying with the standard Universal Serial Bus (USB) specification. The transceiver is further capable of transmitting and receiving signals at a frequency higher than the signals complying with standard USB specification. The transceiver is further capable of configuring itself between transmitting and receiving the higher frequency signals and the standard USB signals.

23 Claims, 2 Drawing Sheets

UNIVERSAL SERIAL BUS TRANSCEIVER AND ASSOCIATED METHODS

RELATED APPLICATION

This patent application is related to concurrently filed U.S. patent application Ser. No. 09/861,297, titled "Voltage Regulator," by M. Beck, filed on May 18, 2001, assigned to the assignee of the present invention and herein incorporated by reference.

BACKGROUND

1. Field

The present invention is related to high speed signal transmission or communications, such as, for example, in a computing or computer system.

2. Background Information

As is well-known, in a computer system, for signal communication to occur between, for example, the computer peripheral and the host computer, today signals are transmitted that comply with a predetermined specification or protocol. This is desirable because it enhances the interoperability between devices manufactured by different entities, for example. One such specification is the well-known Universal Serial Bus specification, version 1.0, available from USB-IF, 2111 NE $25^{th}$ Ave., MS-JF2-51, Hillsboro, Oreg. 97124, (hereinafter referred to as "Standard USB"). The current version of the specification refers to signals that communicate at a low speed, 1.5 megabits per second, and at full speed, 12 megabits per second. However, with increases in the speed of microprocessors, and the number and speed of the peripherals, it has become desirable that signal transmission occur at even higher signal rates. In addition to this desire for high speed signaling, it is also desirable that new computing or computer systems include the capability to comprehend or communicate with legacy systems that operate at the preexisting or lower speed signaling rates. Therefore, it is desirable to have a process or technique for communicating at high speeds when that capability exists, while retaining the capability to communicate at low or state-of-the art speeds to maintain backward compatibility.

SUMMARY

Briefly, in accordance with one embodiment of the invention, an integrated circuit includes: a transceiver capable of transmitting and receiving signals complying with the standard Universal Serial Bus (USB) specification. The transceiver is further capable of transmitting and receiving signals at a frequency higher than the signals complying with standard USB specification. The transceiver is further capable of configuring itself between transmitting and receiving the higher frequency signals and the standard USB signals.

BRIEF DESCRIPTION OF THE DRAWINGS

The subject matter regarded as the invention is particularly pointed out and distinctly claimed in the concluding portions of this specification. The invention, however, both as to organization, and method of operation, together with objects, features and advantages thereof, may best be understood by reference to the following detailed description, when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
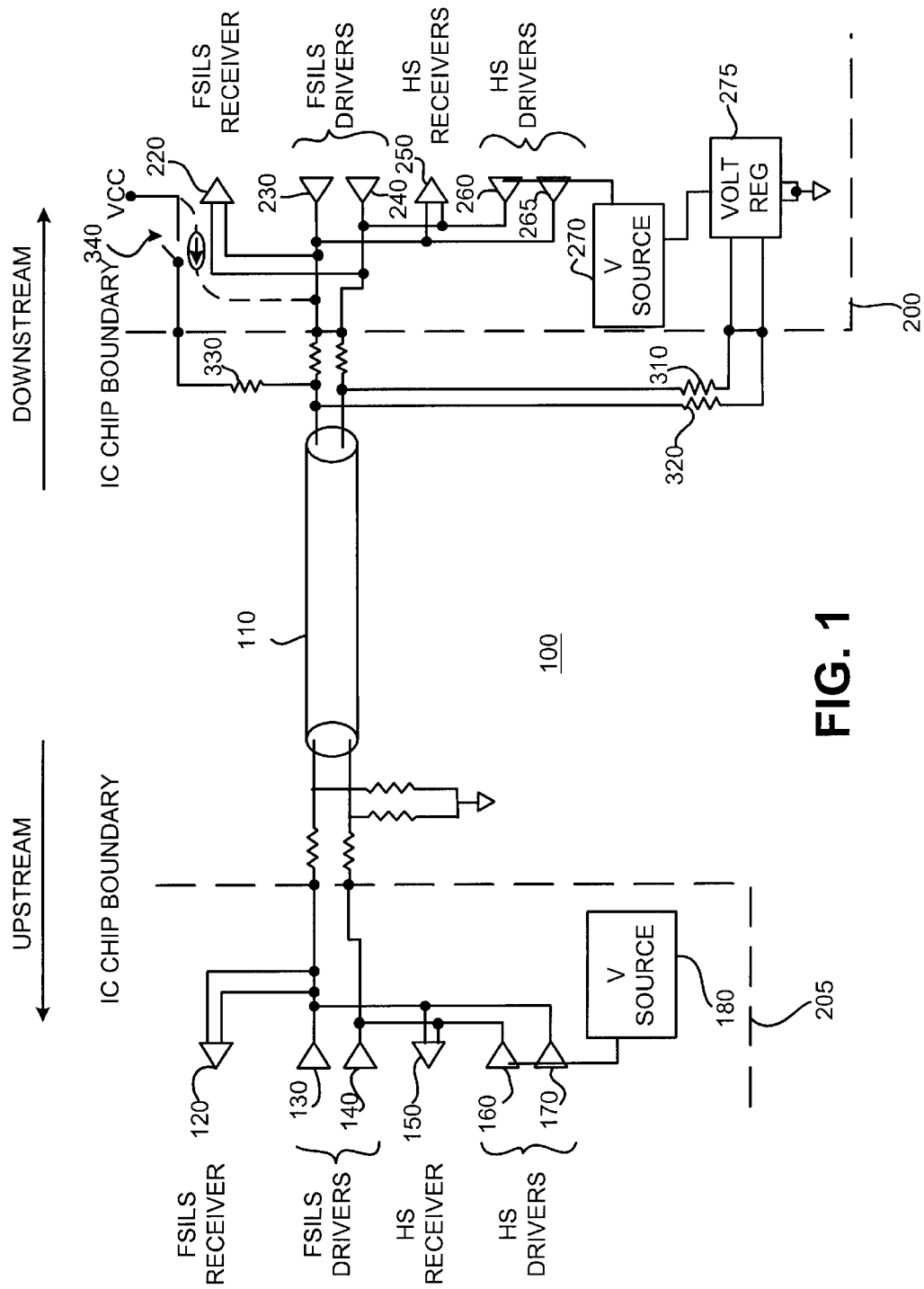
FIG. 1 is a schematic diagram illustrating portions of embodiments of, for example, two integrated circuits in accordance with the present invention, the integrated circuits being coupled by a cable.

FIG. 1 is a schematic diagram that shows an embodiment 100 illustrating portions of embodiments of two integrated circuits in accordance with the present invention. Embodiment 100 includes integrated circuits 200 and 205, although the invention is not limited in scope in this respect. These integrated circuits may be included or incorporated into a variety of systems. For example, without limitation, a host computer and a peripheral in communication with the host computer. As illustrated in FIG. 1, these integrated circuits are coupled via a cable 110, which operates effectively as a transmission line in this context. In this particular embodiment, cable 110 comprises a twisted pair copper wire, although the invention is not limited in scope in this respect. In this particular embodiment, integrated circuit 205 includes an upstream transceiver and integrated circuit 200 includes a downstream transceiver. In this context, the upstream transceiver transmits communication signals to the downstream transceiver, such as from a host to a peripheral, as mentioned above, although the invention is not limited in scope in this respect. It is also noted that this definition of upstream and downstream is the reverse of the approach employed in the previously referenced standard USB specification.

The transceivers illustrated are capable of communicating at low speed, that is 1.5 megabits per second, and at full speed, that is 12 megabits per second, for a standard USB transceiver, as well as at a higher speed. In this particular embodiment, the speed of the high speed signals is 125 megabits per second, although the invention is not limited in scope in this respect. Therefore, at low and full speed, the operation, in terms of signals, of this embodiment is substantially identical to standard USB compliant devices or transceivers. However, as shall be explained in more detail hereinafter, the transceiver is self-configurable in that it is capable of operating in a high speed mode, as well as at a low or a full speed mode. To accomplish this, in this particular embodiment, the transceiver configures itself between two architectures, a standard architecture and a high speed architecture. The added circuitry for the high speed architecture is transparent to the circuitry that operates in a manner that complies with the standard USB specification.

As is well-known, in standard USB, voltage mode drivers are employed with near end series termination. One reason that this approach is undesirable for high speed operation is due to the electromagnetic interference that would be generated by a voltage mode driver operating rail-to-rail at a relatively high speed, such as on the order of 125 megabits per second. A relatively large signal swing in a short period of time, due to the high frequency, may produce an undesirable amount of interference. Therefore, in this particular embodiment, for high speed operation, current driven circuitry with far end parallel termination is employed instead, as shall be described in more detail hereinafter. Signal transmission using current driven signals, as opposed to voltage driven signals, allows for a smaller, better controlled signal swing, as well as for differential signals. Another advantage of the transceiver embodiment illustrated in FIG. 1 is that the transceiver power consumption is lower in high speed mode at 125 megabits per second, for this particular embodiment, than the power consumption for the transceiver in full speed mode at 12 megabits per second. One reason this occurs is because a smaller voltage signal swing consumes less power.

In addition to being current driven, in this particular embodiment, the high speed circuitry employs single side termination. Furthermore, in this particular embodiment, the termination is asymmetrical. More specifically, far end termination is employed when communicating downstream, whereas near end termination is employed when communicating upstream. Communication occurs upstream because the cable or bus is bi-directional. Therefore, one advantage of this approach is that it employs fewer additional pins to accomplish termination then alternative approaches.

Referring to FIG. 1, as illustrated, receiver 120 operates as a low speed and full speed receiver, whereas drivers 130 and 140 respectively operate as full speed and low speed drivers. Of course, 120 could be two receivers as well. The downstream configuration is similar in that receiver 220 operates as a full speed receiver and low speed receiver, whereas 230 and 240 operate as full speed and low speed drivers. Again, 220 could be two receivers also. As illustrated, the circuitry includes the capability to comply with the standard USB specification and it includes the appropriate terminations for satisfactory operation to take place. Therefore, if this transceiver embodiment is communicating either upstream or downstream with a transceiver that does not include high speed capability, low speed or full speed operation may be employed. Likewise, this transceiver embodiment in accordance with the present invention, illustrated in FIG. 1, includes high speed circuitry so that high speed communication may be employed when communicating with a transceiver that likewise includes a similar high speed capability. Therefore, referring to the upstream high speed transceiver, high speed receiver 150 and high speed drivers 160 and 170 may be employed, whereas on the downstream high speed transceiver, high speed receiver 250 and high speed drivers 260 and 265 may be employed. Likewise, the high speed portion of the circuitry includes a voltage source, in this particular embodiment voltage source 180 on the upstream transceiver and voltage source 270 on the downstream transceiver, as illustrated in FIG. 1 in this embodiment. These voltage sources may typically comprise bandgap circuits, although the invention is not limited in scope in this respect. In this embodiment, the downstream transceiver also includes a voltage regulator 275, described in more detail hereinafter.

When communication occurs from the upstream transceiver to the downstream transceiver, far end termination is employed. This occurs in this embodiment because regulator 275 is operational in high speed mode downstream and, therefore, for the downstream transceiver, regulator 275 appears as a relatively low impedance in series with externally supplied resistances 310 and 320. As illustrated, assuming cable 110 in this embodiment has a 90 ohm impedance, such as for a twisted pair of copper wires, resistances 310 and 320 provide a desired far end termination. Of course, the invention is not limited in scope to these resistances. Furthermore, these resistances could alternatively be provided on-chip rather than off-chip.

In contrast, when communication takes place from the downstream transceiver to the upstream transceiver, near end termination is employed. Therefore, the previously described termination also provides the desired termination for downstream to upstream communications. This occurs in this particular embodiment because the upstream high speed drivers, such as 160 and 170, are tri-stated and have a relatively high impedance, while the upstream high, full, and low speed receivers are active (and therefore high impedance). Therefore, the signal transmitted from the downstream transceiver to the upstream transceiver is effectively reflected back due to the high impedance of the upstream transceiver. However, the externally provided 45 ohm resistance of 310 and 320 forms a voltage divider with 90 ohm cable 110 so that approximately half of the energy of the signal is transmitted from the downstream transceiver to the upstream transceiver. Therefore, when the signal is reflected back due to the upstream high impedance just described, the original and reflected signal sum constructively at the upstream transceiver to provide the full signal at the upstream receiver.

As previously indicated, another aspect of this particular embodiment of a transceiver is that the transceiver is self-configurable. This particular embodiment has several different self-configurable aspects, although the invention is not limited in scope to having all these aspects in one embodiment. For example, the transceiver includes the capability to turn the appropriate drivers and receivers on and off depending upon the particular speed of operation that is desired. This capability is not specifically illustrated in FIG. 1, however, in order not to obscure the present invention. However, various signaling protocols may be employed for the transceiver to determine the speed of operation desired and, therefore, configure the drivers and receivers appropriately. For example, although the invention is not limited in scope in this respect, a given transceiver might initially assume operation in a full speed mode and wait for an indication from another transceiver with which it is communicating as to whether that other transceiver is high speed capable. Then if that other transceiver indicates that it is high speed capable, the transceiver in full speed mode may upgrade its communication speed as appropriate. Of course, the invention is not limited in scope to this technique for establishing high speed communication. Regardless of how this is accomplished, if we assume that a transceiver has the capability through signaling protocols to determine the appropriate mode of operation, then this particular transceiver embodiment is self-configurable in that it may couple the appropriate circuit configurations in order to accomplish the desired speed of operation.

In this particular embodiment, the self-configuration is accomplished at the downstream transceiver, although the invention is not limited in scope in this respect. For example, this might be accomplished instead by an upstream transceiver. One advantage of this approach is that providing the self-configurable capability employs, in this embodiment, three additional external connections. Therefore, placing these extra connections or pins with the downstream transceiver may ultimately reduce the number of additional pins in a system because, for example, a multi-port device, such as a hub, will typically employ one downstream transceiver yet multiple upstream transceivers. Therefore, this technique reduces the number of extra pins employed in order to have this self-configuration capability since multiple upstream transceivers would result in multiple extra pins if that approach were employed.

For the embodiment illustrated in FIG. 1, one aspect of this self-configuration capability is exhibited by switch 340 and resistor 330. As is known, one aspect of complying with the standard USB specification is providing a 1.5 kilo-ohm pull-up resistor, such as resistor 330, for full speed mode operation. Therefore, switch 340 may be provided on integrated circuit 200 in this particular embodiment and will remain open for high speed operation and closed for full speed operation. Of course, the invention is not limited in scope in this respect and an additional pin and resistor 330 may be avoided by instead providing a current source that simulates the rise time specified in the standard USB specification when connection to a cable is accomplished for full speed operation. This is shown in FIG. 1 by a dotted line. In this context, the term "current source" refers to a transistor coupled so that in operation it resembles the circuit characteristics of a current source. In embodiments in which this latter approach is employed, the downstream transceiver may therefore be self-configurable and employ two external connections instead of three external connections.

As illustrated in FIG. 1, these two external connections are employed to couple two resistors 310 and 320 providing the parallel terminations previously described, although, of course, the invention is not limited in scope in this respect. However, as shall be explained in more detail hereafter, these pins couple these parallel terminations to voltage regulator 275. Providing parallel far end termination for the upstream transceiver is only one aspect of employing voltage regulator 275 in this particular embodiment. As previously described, when voltage regulator 275 is operational, it provides as a relatively low impedance in series with parallel termination resistors 310 and 320. However, in an alternative mode, voltage regulator 275 may no longer operate as a voltage regulator and in this mode of operation may provide a relatively high impedance. This mode of operation for voltage regulator 275 is desirable when full speed or low speed operation is desired for the transceiver, hence, furthering the self-configurability of the transceiver.

The effect of employing the voltage regulator in this fashion provides for the two different signaling techniques or modes previously described. When the voltage regulator is operational providing a relatively low impedance, this allows the transceiver to perform current mode signaling, as previously described, so that high speed communication may occur. Alternatively, when the voltage regulator is off, and, therefore providing a relatively high impedance, this allows for voltage mode signaling, as is traditionally employed in standard USB, to take place. Thus, voltage regulator 275 is another aspect of the self-configurability in this transceiver embodiment.

In addition to providing the capability to disconnect or decouple the parallel termination, as previously described, voltage regulator 275 also sinks and sources current when high speed communication is occurring, while maintaining a substantially constant voltage level. Maintaining a substantially constant voltage level, particularly above ground, is desirable because it maintains the voltage level of the downstream transceiver at a voltage level so that a high speed receiver may operate satisfactorily. Although the invention is not limited in scope in this respect, one embodiment of such a voltage regulator is described in the aforementioned concurrently filed patent application titled "Voltage Regulator," by M. Beck, assigned to the assignee of the present invention and herein incorporated by reference.

Figure 2:
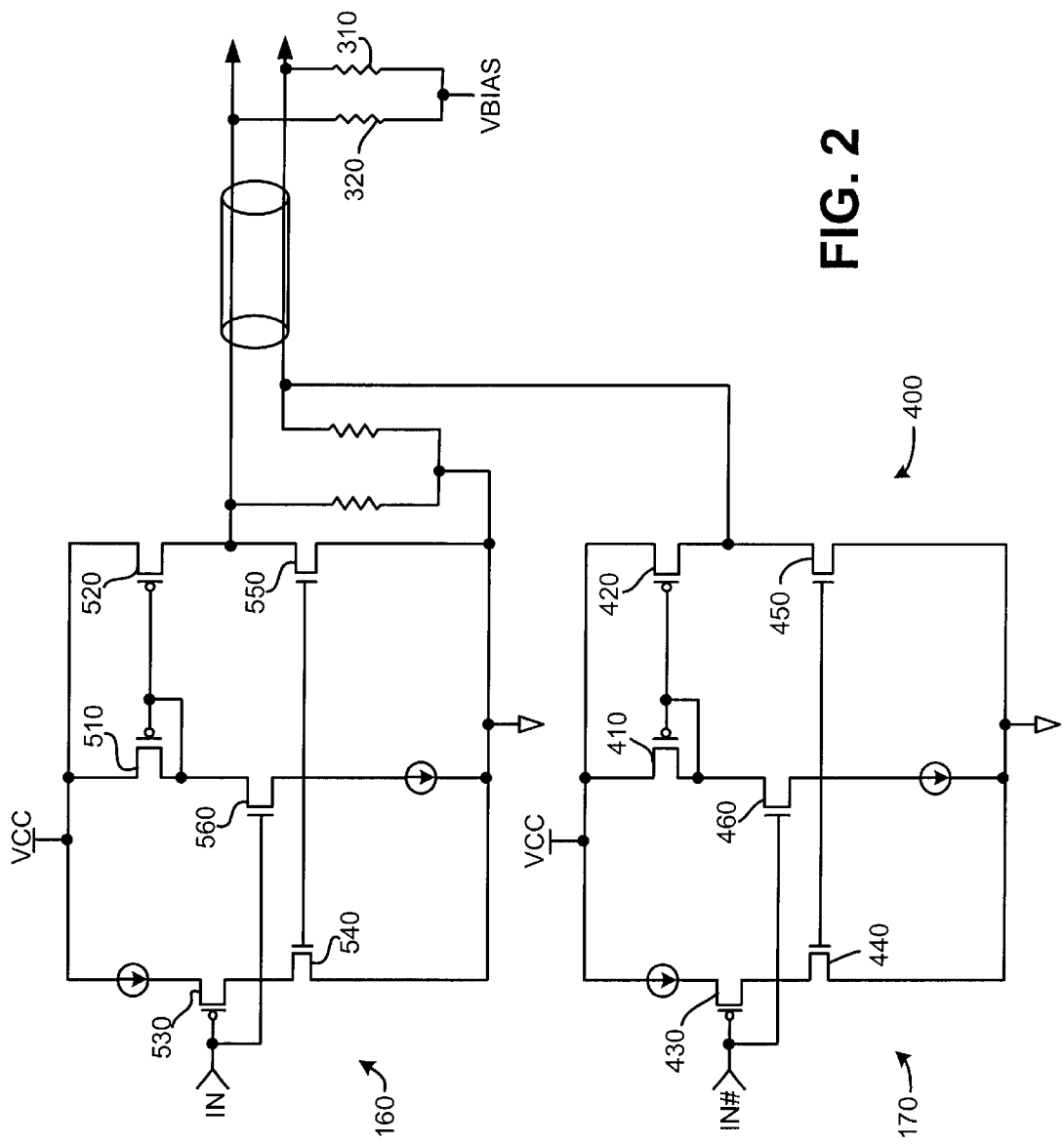
FIG. 2 is a circuit diagram illustrating an embodiment of drivers that may be employed, for example, in one of the integrated circuits of FIG. 1.

FIG. 2 is a circuit diagram illustrating an idealized embodiment of high speed drivers for embodiment 205 of an integrated circuit in accordance with the present invention shown in FIG. 1. These drivers correspond to drivers 160 and 170 in FIG. 1, although, the invention is not limited in scope to this particular embodiment. Many other embodiments of high speed drivers may be employed in an integrated circuit in accordance with the present invention. Likewise, as previously described, this particular embodiment assumes far end termination is employed. As illustrated in FIG. 2, each high speed driver in this particular embodiment comprises two switched current sources coupled in parallel. In this context, the term "current source" refers to a transistor coupled so that in operation it resembles the circuit characteristics of a current source. To signal a logical one, the current source in the first driver formed by transistors 510, 520, 530, 540, 550 and 560 turns on, supplying current to the 90 ohm twisted pair cable, and to the terminating resistors 310 and 320, in this particular embodiment. The current source in driver 170 formed by transistors 410, 420, 430, 440, 450 and 460 is also turned on, sinking current from the terminating resistors and the cable. To signal a logical zero, driver 170 sources current and driver 160 sinks current. Assuming about a 500 millivolt signal swing, although the invention is not limited in scope in this respect, that is, the predetermined voltage level of voltage regulator 275 plus or minus about 250 millivolts, a current of about 5.5 milliamps is employed. To reduce electromagnetic interference, it is desirable that the signals produced by the driver be symmetrical, which makes employing substantially identical drivers desirable. It is likewise desirable to match the rise and fall times for the signals produced. It is therefore desirable to size the transistors forming the current mirrors of the drivers appropriately because the size of the transistors affects gate capacitance, which may impact the signal rise and fall times. In this particular embodiment, as illustrated in both FIG. 1 and FIG. 2, two pins are employed for voltage regulator 275. This provides the capability to disconnect or decouple the parallel termination provided by resistors 320 and 310 when desired without allowing these two resistors to form a circuit loop through the voltage regulator. Thus, placing the voltage supply in a high impedance state in order to accomplish full speed operation effectively switches out the parallel terminations from the transceiver, as is desired for this embodiment.

While certain features of the invention have been illustrated as described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An integrated circuit comprising:
   a transceiver capable of serially transmitting and receiving signals complying with the standard Universal Serial Bus (USB) specification over a communication path;
   said transceiver further being capable of serially transmitting and receiving signals at a frequency higher than the signals complying with the standard USB specification over the communication path;
   said transceiver capable of configuring itself to transmit and receive the higher frequency signals.

2. The integrated circuit of claim 1, wherein the higher frequency signals have a frequency of at least 125 megabits per second.

3. The integrated circuit of claim 1, wherein said transceiver is capable of configuring itself using no more than three external connections.

4. The integrated circuit of claim 3, wherein the transceiver comprises a downstream transceiver, two of the three external connections being employed to couple to a transmission line termination.

5. The integrated circuit of claim 4, wherein one of the three external connections is employed to couple to a pull-up resistance in order to comply with the standard USB specification.

6. The integrated circuit of claim 1, wherein said transceiver is capable of configuring itself using no more than two external connections.

7. The integrated circuit of claim 1, wherein said transceiver includes a voltage regulator to sink and source current while maintaining a substantially constant voltage level.

8. The integrated circuit of claim 1, wherein the transceiver comprises an upstream transceiver, said upstream transceiver including two substantially identical high speed current drivers.

9. The integrated circuit of claim 8, wherein said upstream transceiver is coupled so as to communicate with a downstream transceiver via a cable.

10. The integrated circuit of claim 9, wherein said upstream transceiver is far end terminated.

11. The integrated circuit of claim 9, wherein said downstream transceiver is capable of transmitting and receiving signals complying with the standard USB specification;

said downstream transceiver being capable of transmitting and receiving signals at a frequency higher than the signals complying with the standard USB specification;

said downstream transceiver capable of configuring itself to transmit and receive the higher frequency signals.

12. A system comprising:

a downstream transceiver; an upstream transceiver; and a cable coupling the upstream and downstream transceivers;

said transceivers capable of transmitting and receiving signals complying with the standard Universal Serial Bus (USB) specification over the cable;

said transceivers further being capable of transmitting and receiving signals at a frequency higher than the signals complying with the standard USB specification over the cable;

said transceivers capable of configuring themselves to transmit and receive the higher frequency signals.

13. The system of claim 12, wherein said upstream transceiver is coupled to transmit and receive signals for a host computer, and wherein said downstream transceiver is coupled to transmit and receive signals for a computer peripheral.

14. The system of claim 13, wherein said higher frequency signals have a frequency of at least 125 megabits per second.

15. A method of configuring a transceiver to serially transmit and receive high frequency signals over a communication path, said transceiver being capable of serially transmitting and receiving signals complying with the standard Universal Serial Bus (USB) specification over the communication path, said high frequency signals having a frequency higher than the signals complying with the standard USB specification, said method comprising:

enabling a voltage regulator to sink and source current while maintaining a substantially constant voltage level, said voltage regulator being coupled to resistances providing a transmission line termination; and decoupling a pull-up resistance provided to comply with the standard USB specification.

16. The method of claim 15, wherein said transceiver comprises at least one of a downstream transceiver and an upstream transceiver.

17. The method of claim 15, wherein the termination resistances comprise approximately 45 ohms.

18. The method of claim 15, wherein the pull-up resistance comprises approximately 1.5 kilo-ohms.

19. An apparatus comprising:

means for serially transmitting and receiving signals complying with the standard Universal Serial Bus (USB) specification over a communication path;

means for serially transmitting and receiving signals at a frequency higher than the signals complying with the standard USB specification over the communication path; and means for configuring the apparatus to transmit and receive the higher frequency signals.

20. The apparatus of claim 19 wherein the higher frequency signals have a frequency of at least 125 megabits per second.

21. The apparatus of claim 19 wherein the apparatus is capable of configuring itself using no more than three external connections.

22. The apparatus of claim 19 wherein the communication path comprises a cable.

23. The apparatus of claim 19 wherein the apparatus is coupled so as to communicate with an upstream transceiver.

* * * * *